C. A. CUMMINGS & F. M. SWALLOW, Assignors to
METROPOLITAN WASHING MACHINE COMPANY.
Improvement in Clothes Wringers.
No. 4,574. Reissued Oct. 3, 1871.
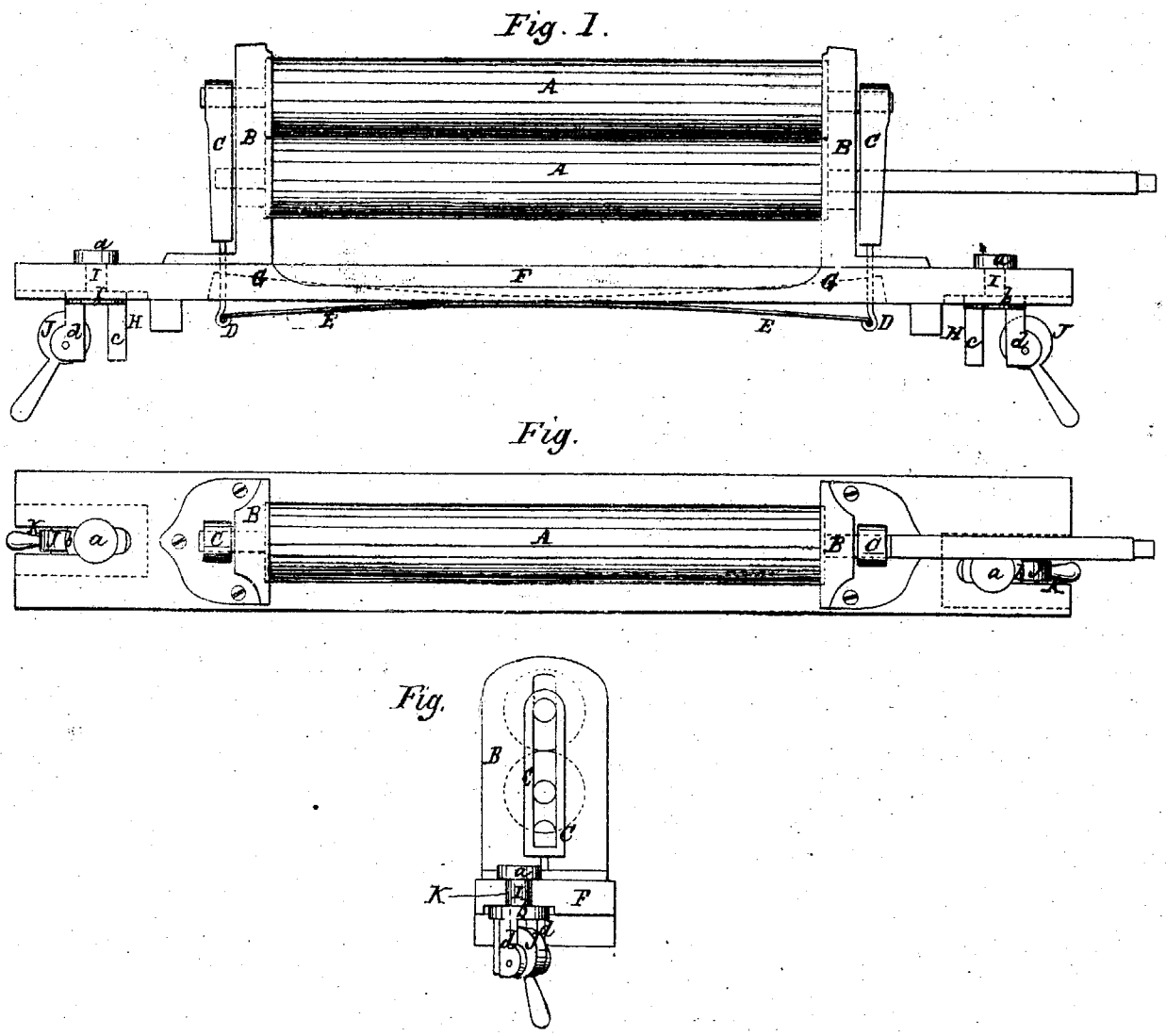
Witnesses.
C. B. Nottingham
J. R. Nottingham
Inventor.
Metropolitan Washing Machine Co.
assignees of C. A. Cummings & F. M. Swallow
by A. Bollok
Atty.

UNITED STATES PATENT OFFICE.

CHARLES A. CUMMINGS AND FREEMAN M. SWALLOW, OF WORCESTER, MASSACHUSETTS, ASSIGNORS, BY MESNE ASSIGNMENTS, TO METROPOLITAN WASHING-MACHINE COMPANY, OF MIDDLEFIELD, CONNECTICUT.

IMPROVEMENT IN CLOTHES-WRINGERS.

Specification forming part of Letters Patent No. 34,395, dated February 11, 1862; reissue No. 4,574, dated October 3, 1871.

*To all whom it may concern:*

Be it known that CHARLES A. CUMMINGS and FREEMAN M. SWALLOW, both of Worcester, in the county of Worcester and State of Massachusetts, have invented certain new and useful Improvements in Clothes-Wringers, of which the following is a specification:

These improvements relate first, to the wringing mechanism proper of a clothes-wringing machine, and, secondly, to the means for holding the machine to the tub. So far as concerns the first portion of these improvements we are aware that clothes-wringers have been made with rolls having a method of adjustment to set to different kinds of work by means of screws and springs, and sliding boxes, or some similar arrangement or attachment, requiring to be set or regulated by hand. This invention, so far as it concerns the wringing mechanism proper, is designed to render the rolls self-adjusting without the use of screws, levers, or other means usually employed to graduate the pressure of the rolls; and to this end it consists in making the rolls self-adjustable by means of a spring and straps or yokes, substantially in the manner hereinafter described. The second portion of these improvements relate to the means employed for clamping the wringer to the tub. We are aware that that two-legged yokes have been before employed for this purpose, placed at each end of the machine, and arranged so that the two legs of each yoke will pinch or clamp the side of the tub on directly opposite sides thereof. But all such two-legged yokes heretofore have been made rigid and without capacity for adjustment to the size or curvation of the tub; and to this extent they have, therefore, been defective, inasmuch as the legs could not be set square to the tub so as to be diametrically on opposite sides, and thus take a square bearing on the two points at which they were in contact with the tub. This invention is designed to remedy this difficulty by providing at each end of the machine a vertically self-adjusting two-legged yoke, in combination with a holding device in one of the legs of the yoke, substantially as hereinafter described.

In the accompanying drawing, Figure 1 is a front elevation of a machine made in accordance with this invention. Fig. 2 is a plan of the same. Fig. 3 is an end elevation of the same.

The shafts of the rolls A are supported in bearings in the standards B, which form part of the frame of the machine. The lower roll revolves in fixed bearings, while the bearings of the upper roll are capable of sliding up and down, as usual in clothes-wringers. The ends of the shaft of the upper roll extend out beyond the frame on each side of the machine and receive the straps or yokes C. The straps pass down and connect by the hook-rods D D to the ends of the spring E below the base F. The base supports the standards B B, and between them has its upper surface beveled each way from the middle, and is cut beneath, as shown by the dotted lines G G, to give free play to the ends of the spring E. When the one roll of the machine, the lower, in this instance, is revolved by crank or other means the other will be driven by its friction with the first; or the two rolls may be geared together, giving the teeth of the gear length enough to allow the separation of the rolls. The spring E keeps a continuous pressure on them, and when a bunch or thick part or thicker piece of clothing is passing between the rolls the spring allows the necessary separation of the rolls, and returns them to place after it has passed through, thus avoiding the necessity of adjustment for different kinds of work, the rolls working either way. The devices which are employed to hold the wringer to the tub consist of the two-legged yokes H, which are made self-adjusting vertically so as to turn and adapt themselves to the curvature of the tub; this result being attained in this instance by making each with a shank, I, fitting in a slot, K, in the base of the wringer-frame, provided at its top and bottom with buttons or plates *a b*, which fit respectively against the upper and under side of the base and prevent the yoke from dropping through or being accidentally lifted out of the slot; while the yoke is capable of vertical self-adjustment—that is to say, of adjustment upon a vertical axis—by means of the shank I, which can turn in the slot. The slots K are made of considerable length, running lengthwise of the base, so that the yokes may be set nearer to or further from each other, and thus allow the machine to embrace a greater or less segment of the tub, as desired. To the lower button *b* of each yoke the two legs *c d* are secured, placed diametrically opposite each other, so that in each yoke the one leg and the clamping device on the other leg may pinch the tub on directly opposite sides, thus holding the tub at only two points at each end, and rendering easy the adjustment and manipulation and fitting to the tub of the yoke. The clamping or holding device in the present instance employed consists of the cam or eccentric J pivoted to one leg, *d*, and provided with a handle by which it may be operated.

What is claimed as the invention of the said CHARLES A. CUMMINGS and FREEMAN M. SWALLOW is as follows:

1. Making the rolls self-adjustable by means of the straps and spring, when constructed and operating substantially in the manner and for the purpose above set forth and described.

2. As a means of attaching clothes-wringers to tubs, a vertically self-adjusting two-legged yoke in combination with a holding or pinching device, substantially as described.

3. A clothes-wringer in which the clamping or holding-yokes are adjustable to varying distances from each other so that the machine may embrace a greater or less segment of the tub, substantially as shown and described.

4. The combination, with the frame of a clothes-wringer, of two-legged yokes or holders adjustable both vertically or upon a vertical axis, and toward and away from each other, substantially as herein shown and described.

In testimony whereof I have signed my name to this specification in the presence of two subscribing witnesses.

R. C. BROWNING,
*President Metropolitan Washing-Machine Co.*

Witnesses:
WM. F. ARCHER,
WM. H. CLARKSON.

(117)